US005842268A

United States Patent [19]

Arnfield

[11] Patent Number: 5,842,268

[45] Date of Patent: Dec. 1, 1998

[54] TERMINATION TOOL

[75] Inventor: Robert Arnfield, Bateau Bay, Australia

[73] Assignee: Krone Aktiengesellschaft, Berlin, Germany

[21] Appl. No.: 843,880

[22] Filed: Apr. 18, 1997

[30] Foreign Application Priority Data

Apr. 20, 1996 [DE] Germany .......................... 196 16 912.7

[51] Int. Cl.[6] ........................................ B23P 23/00

[52] U.S. Cl. ........................................ 29/566.4; 29/751

[58] Field of Search .............................. 29/33 M, 566.1, 29/566.2, 566.3, 566.4, 749, 750, 751, 755, 758

[56] References Cited

U.S. PATENT DOCUMENTS

| | | | |
|---|---|---|---|
| 3,881,248 | 5/1975 | Kaufman | 30/90.1 |
| 4,241,496 | 12/1980 | Gregson | 29/751 |
| 4,300,282 | 11/1981 | Bunyea et al. | 29/566.4 |
| 4,327,485 | 5/1982 | Rix | 29/758 |
| 4,434,542 | 3/1984 | Forberg et al. | 29/566.4 |
| 4,567,639 | 2/1986 | Fasano | 29/566.4 |
| 4,642,874 | 2/1987 | Litehizer, Jr. | 29/566.4 |
| 4,682,412 | 7/1987 | Pfeffer | 29/758 |
| 4,696,090 | 9/1987 | Gregson et al. | 29/566.4 |
| 4,784,669 | 11/1988 | Maack | 29/566.4 |
| 5,195,230 | 3/1993 | Krietzman . | |
| 5,613,297 | 3/1997 | Dvorak et al. | 29/861 |
| 5,628,105 | 5/1997 | Fallandy et al. | 29/566.4 |
| 5,666,715 | 9/1997 | Zoiss et al. | 29/566.4 |

FOREIGN PATENT DOCUMENTS

| | | |
|---|---|---|
| 0 040 307 B1 | 3/1981 | European Pat. Off. . |
| 38 03 969 C1 | 4/1989 | Germany . |
| 43 33 263 C2 | 9/1995 | Germany . |
| 2 128 922 | 5/1984 | United Kingdom . |

*Primary Examiner*—Andrea L. Pitts
*Assistant Examiner*—Christopher Kirkman
*Attorney, Agent, or Firm*—McGlew and Tuttle

[57] ABSTRACT

A termination tool for connecting incoming and outgoing conductors to contact elements in termination modules for a large range of wire diameters. The tool including a housing handle and a pressing and cutting device. The housing handle has a front opening. The combined cutting and pressing device includes a pressure rod with springs a knife carrier with knives sliding in a cam housing and a cover of the cutting and pressing device. The cover sliding during actuation of the cutting and pressing device on the housing handle.

8 Claims, 7 Drawing Sheets

TERMINATION TOOL

FIELD OF THE INVENTION

The present invention relates to a termination tool for connecting incoming and outgoing conductors to contact elements in termination modules for a large range of wire diameters.

BACKGROUND OF THE INVENTION

In DE 43 33 263 C2 there is already described a termination tool comprising an ergonomically standardized handle and a double-T-shaped tool head with a slot in the central web. By means of the tool head, a conductor is pressed into the contact slot of an insulation displacement contact element with the latter engaging into the slot, so that the tool head can act on the conductor on either side of the blade-shaped insulation displacement contact element and press it into the contact slot. By means of the sharp-edged blades of the contact legs, the insulation of the conductor is cut, and the metal conductor electrically contacts the insulation displacement contact element.

This prior art tool is only suitable for the termination of smaller wire diameters to insulation displacement contact elements and cannot always be brought in a convenient handling position.

In EP 0 040 307 B1 there is described a tool for electrically terminating insulated conductor wires, wherein a strike mechanism and a plunger longitudinally displaceable against a spring force are disposed. The plunger head projects at the front from the handle and serves for transversely pressing the conductor end into the contact slot. The plunger head further comprises a wire cutter for cutting off the conductor wire after pressing-in.

It is disadvantageous, herein, that only relatively small wire diameters can be pressed into insulation displacement contacts of the insulation displacement termination technique widely used in the communication and data technology, and cut off thereafter. Wiring termination modules for larger current and voltage loadability is not possible due to the required larger contacting forces.

SUMMARY AND OBJECTS OF THE INVENTION

It is therefore an object of the invention to develop a multi-functional termination tool, by means of which convenient and reliable connection and disconnection of cable wires in termination modules are guaranteed for a large range of wire diameters.

The solution of this object is achieved by that through a front opening of the housing handle, a combined cutting and pressing device comprising a pressure screw with springs, a knife carrier with knives, a cam housing is applied, and that a cover sliding during actuation of the cutting and pressing device on the housing handle is provided.

The cover with the cutting and pressing device is lockable in four latch positions on the housing handle, so that for every termination situation a convenient handling of the termination tool is guaranteed.

The cam control allows the cutting of cables or wires having large wire diameters with the exertion of little force and to press the cables thereafter into a contact slot of the termination module. The force required is not larger than that used for pressing the cable into the contact slot.

The termination tool has a simple and robust construction and is easily mountable.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figures 1, 1A:
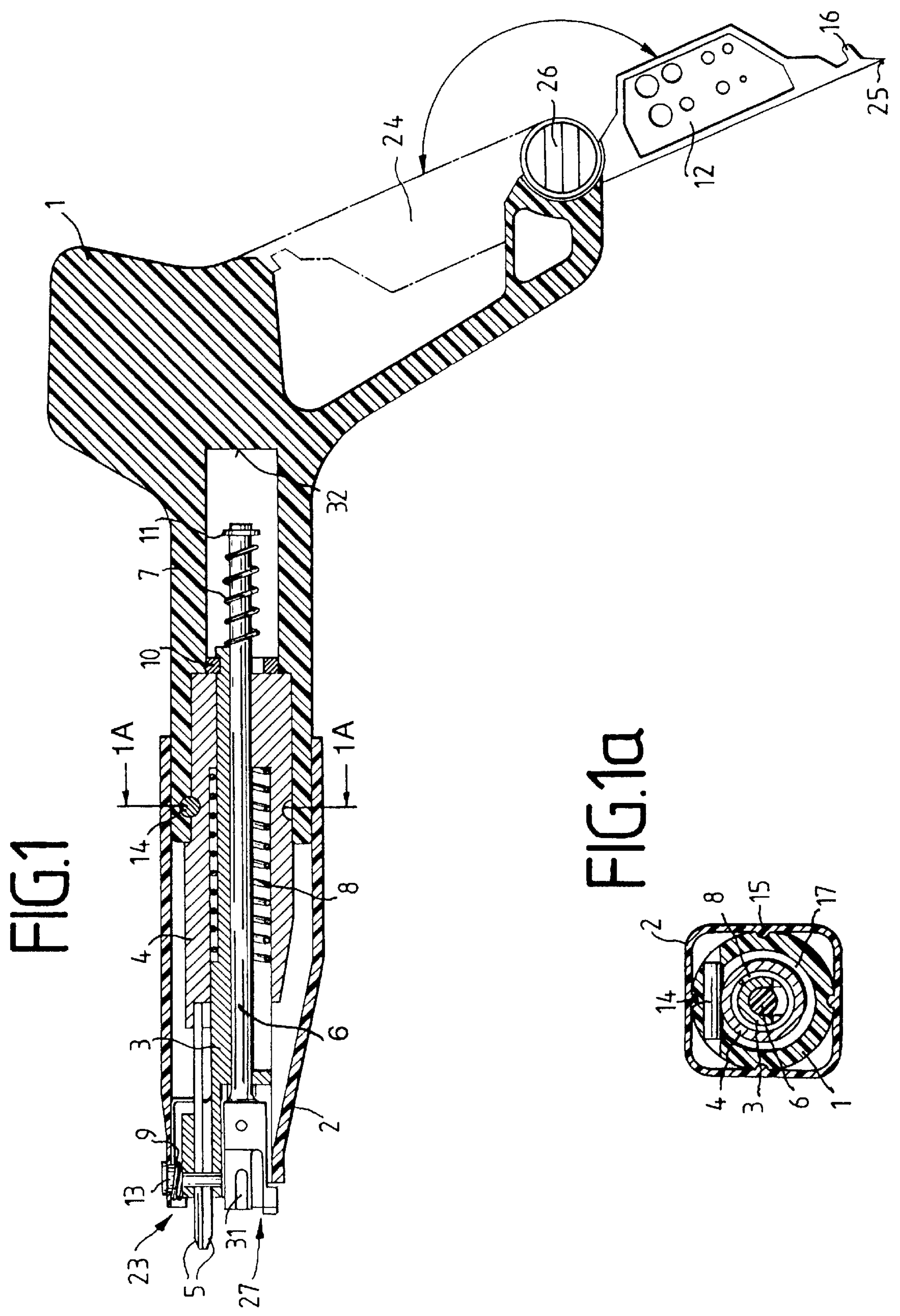
FIG. 1 a sectional representation of the side view of the tool in the rest position.
FIG. 1*a* is a sectional view at the position 1A—1A of the tool of FIG. 1.

Referring to the drawings, and in particular to FIG. 1, the termination tool substantially comprises a one-piece housing handle 1, a cover 2, a tool head 23 with a knife carrier 3, a cam housing 4, two knives 5, a pressure rod 6, springs 7, 8, 9, retaining rings 10, 11, a wire diameter measuring and releasing device 12 to be swung out from the housing handle 1, a pin 13 and a peg 14.

The termination tool is suitable for the termination of copper cables up to 2.5 $mm^2$ size or 1.8 mm conductor diameter or 3.8 mm cable diameter in termination modules of up to 1000 V.

The termination and cable separation process is performed in reversed order from the process using the known termination tools for the insulation displacement contact technique as in the termination tool of EP 0 040 307 B1.

The cable to be wired is placed on the contact of the not shown termination module, where it will be locked by a pre-fixing means, such as clamping ribs. Then the termination tool is brought on this cable position and is pressed down. The cable is first cut to length and only then completely pressed into the contact slot.

The cut-off cable end is covered after pressing-in and is not accessible anymore.

Figure 11:
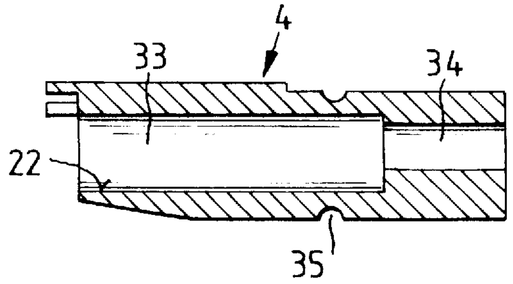
FIG. 11 is a sectional representation of the cam housing of FIG. 1.
Figure 12:
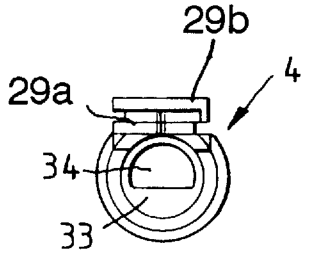
FIG. 12 is a top view of the left-hand front side of the cam housing of FIG. 11.

The tool is handily shaped and does not require for the cutting of strong cables an exertion force larger than needed for pressing-in alone. The reduction of the force exertion is made possible by the employed cam control and by means of the cam housing 4, as shown in FIGS. 11, 12.

Figure 2:
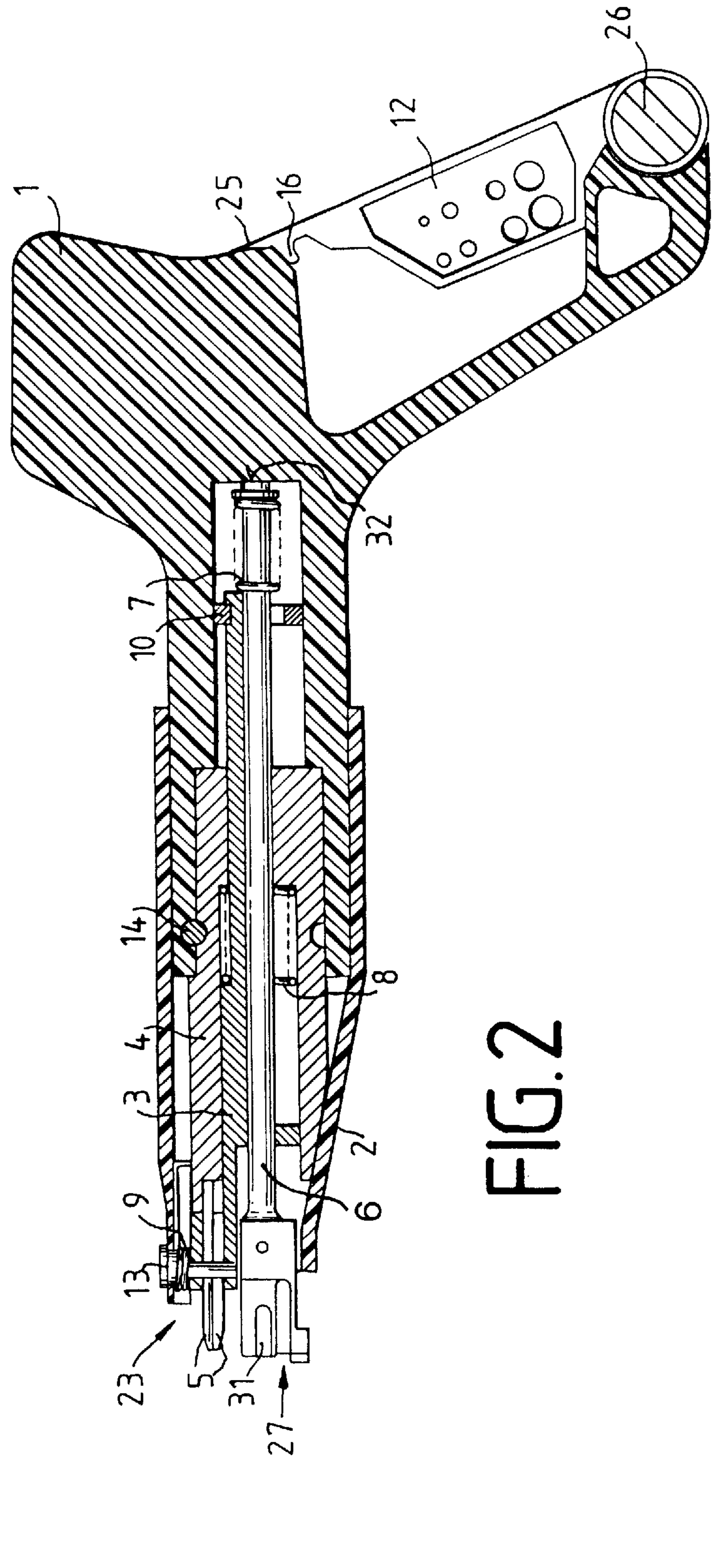
FIG. 2 is a sectional representation of the side view of the tool of FIG. 1 in the operating position.
Figure 3:
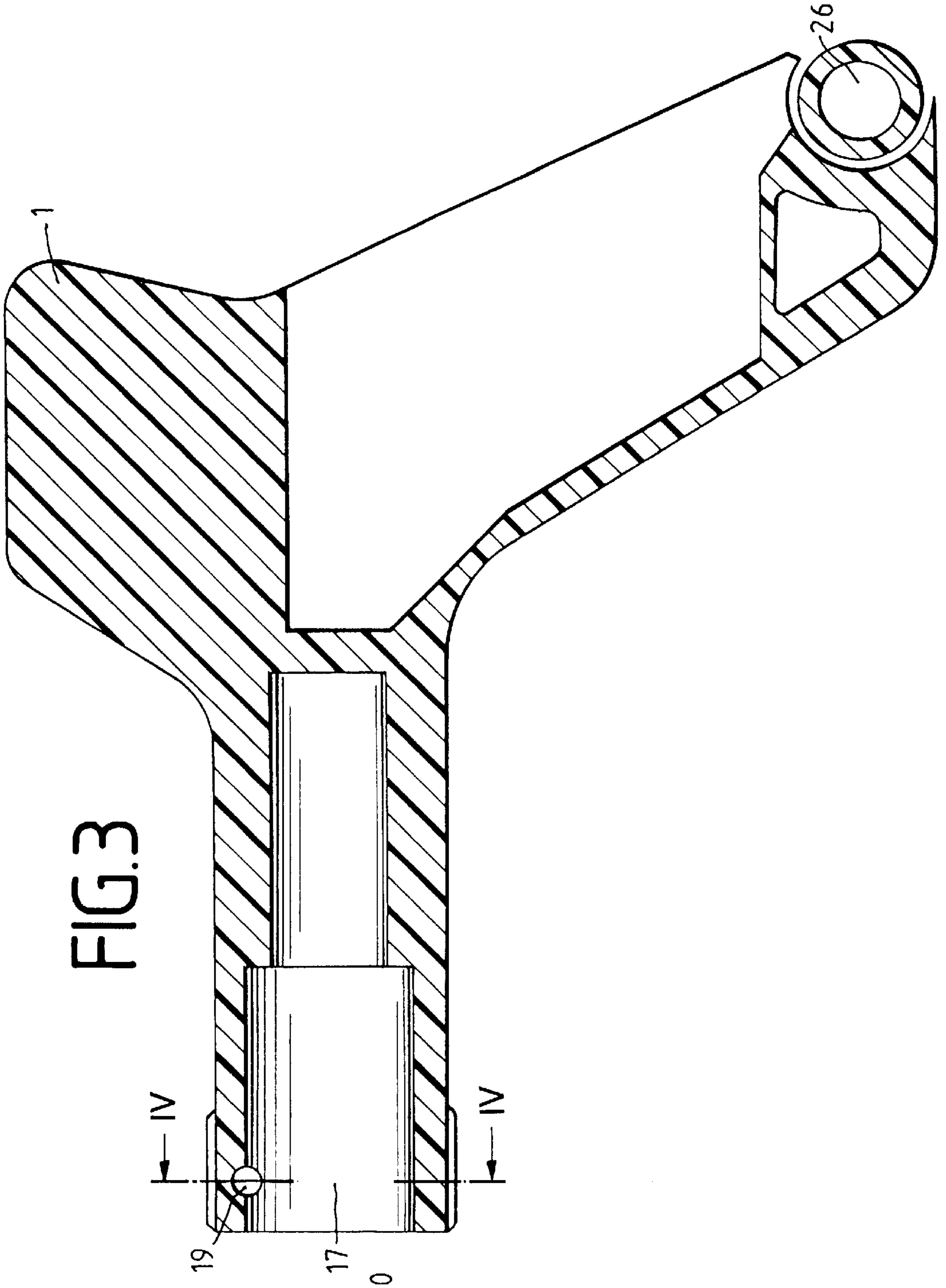
FIG. 3 is a side view of the housing handle of the tool of FIG. 1 in a sectional representation.
Figure 4:
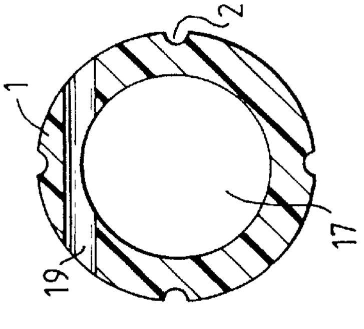
FIG. 4 is a sectional representation of the housing handle of FIG. 3 at the position IV—IV.

The complete cutting/pressing device of the tool, the tool head 23 substantially comprising the cam housing 4, the spring 9, the knife carrier 3 with the knives 5 in the through-hole of which the pressure rod 6 with the spring 7 is guided, and the retaining ring 11, the pin 13 and the spring 8, is inserted from the front through a circular opening 17 of the housing handle 1, shown in FIGS. 3, 4. All of this is secured inside at the position 19, FIG. 3, by the peg 14, FIGS. 1, 2, 4, at the housing handle 1. The cover 2 is latched in the housing handle 1 by latch elements 15 of the cover 2 in grooves 20 of the housing handle 1, FIGS. 1*a*, 4.

Figure 5:
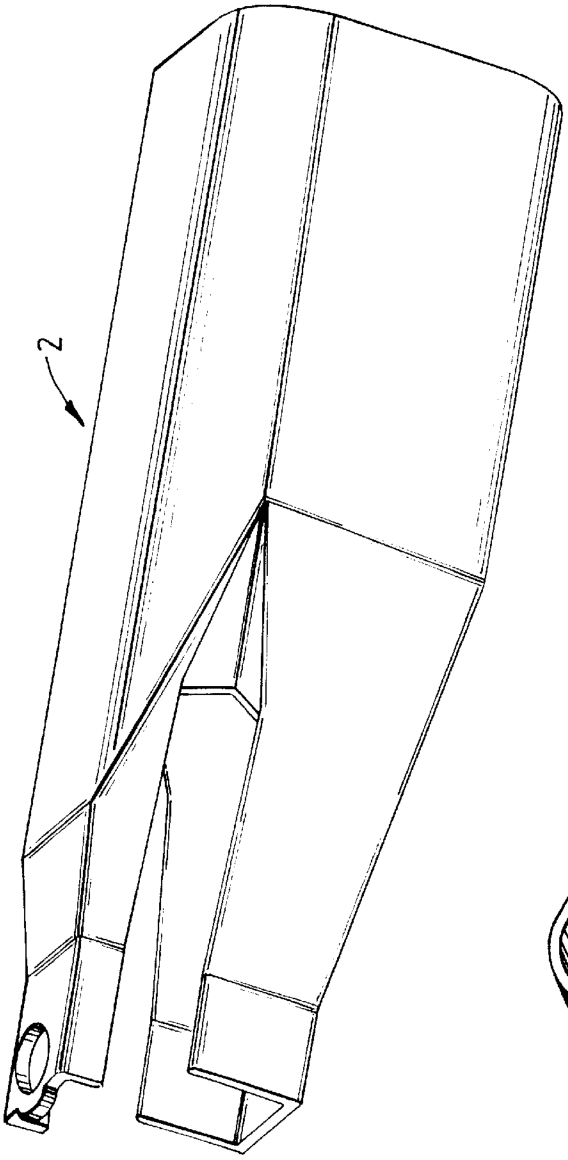
FIG. 5 is a perspective view of the cover of the tool of FIG. 1.
Figure 6:
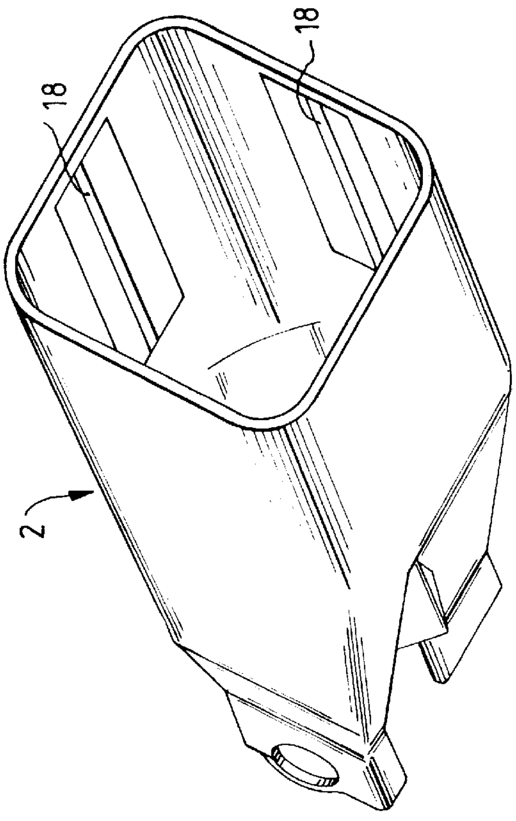
FIG. 6 is a perspective top view of the rear part of the cover of FIG. 5.

The cover 2, FIGS. 5, 6, comprises four axial ribs 18 permitting several rotations of the tool head 23 by 90 degrees about the housing handle 1 into four latch positions. This allows the cutting/pressing device to come against the contact to be terminated in a position that is most convenient for reliable handling of the tool. The cover 2 slides axially at the housing handle 1 as far as the tool is actuated, FIG. 2.

Figure 7:
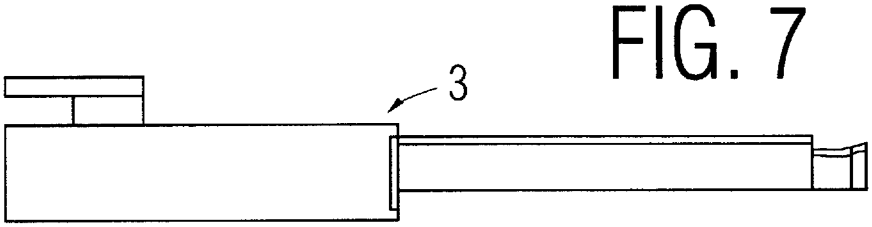
FIG. 7 is a side view of the knife carrier of the tool of FIG. 1.
Figure 8:
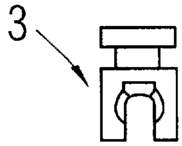
FIG. 8 is a top view of the left-hand front side of the knife carrier of FIG. 7.
Figure 9:
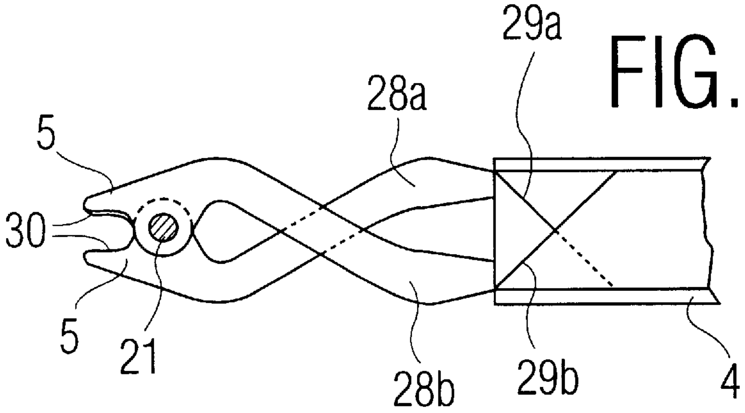
FIG. 9 is a top view of the knives of the tool of FIG. 1 in a first position.
Figure 10:
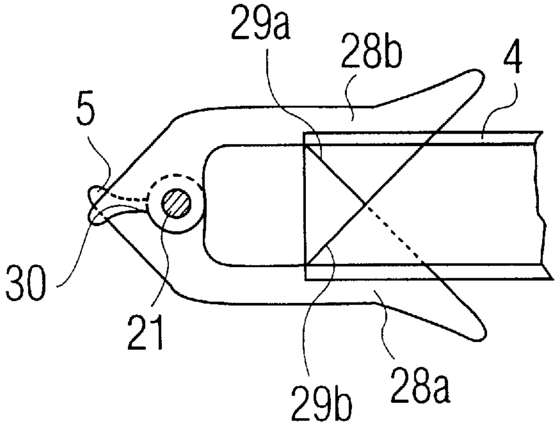
FIG. 10 is a top view of the knives of the tool of FIG. 1 in a second position.

The termination tool operates according to the representation of FIG. 2 as follows:

The knife 5 with the knife blade 30 and the knife shafts 28*a*, 28*b* shown in FIGS. 9, 10, are mounted on the knife carrier 3, FIGS. 7, 8, about the point of rotation 21 of the pin 13 with the spring 9, FIGS. 1, 9. The knife shafts 28*a*, 28*b* slide against cam surfaces 29*a*, 29*b* of the cam housing 4, when the tool is pressed onto the wire to be terminated, in order to cut it to length. The knife carrier 3 slides along an inner side 22 of the cam housing 4, FIG. 11, until the wire is cut off. The cam housing 4 is slid over the knife carrier 3.

The cam housing 4 comprises, according to the representation of FIGS. 11, 12, a cylindrical hollow body 33 with a groove 35, and with guide and spread faces or cam surfaces 29*a*, 29*b* for guiding the knife shafts 28*a*, 28*b*. In the rear half of the cam housing 4 is provided an inner flattened borehole 34 forming a stop for the pressure spring 8, FIG. 12.

The pre-assembled knife carrier 3 is introduced into the cam housing 4 and is fixed by means of a retaining ring 10 at the cam housing 4.

The pressure rod 6 slides inside the knife carrier 3 further backwards to the position where it will rest against the rear wall 32 of the housing handle 1, FIGS. 1, 2, and will press the wire down to the bottom of the contact slot of the termination module. When the wire is pressed into the contact slot and no pressure is exerted anymore, the complete mechanism will be withdrawn by the force of the springs 7, 8, 9 into the initial position, FIG. 1. The pressure spring 7 is slid on the pressure rod 6 and is fixed by means of the retaining ring 11.

Figure 13:
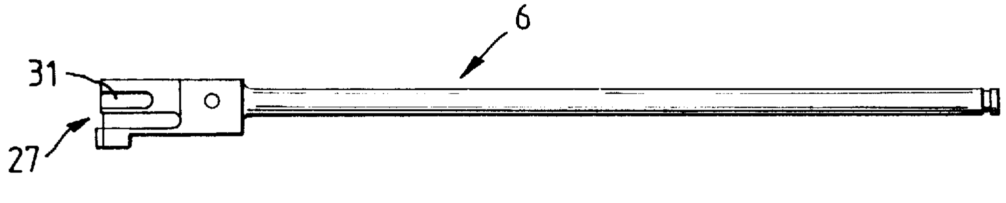
FIG. 13 is a top view of the pressure rod of the tool of FIG. 1.
Figure 14:
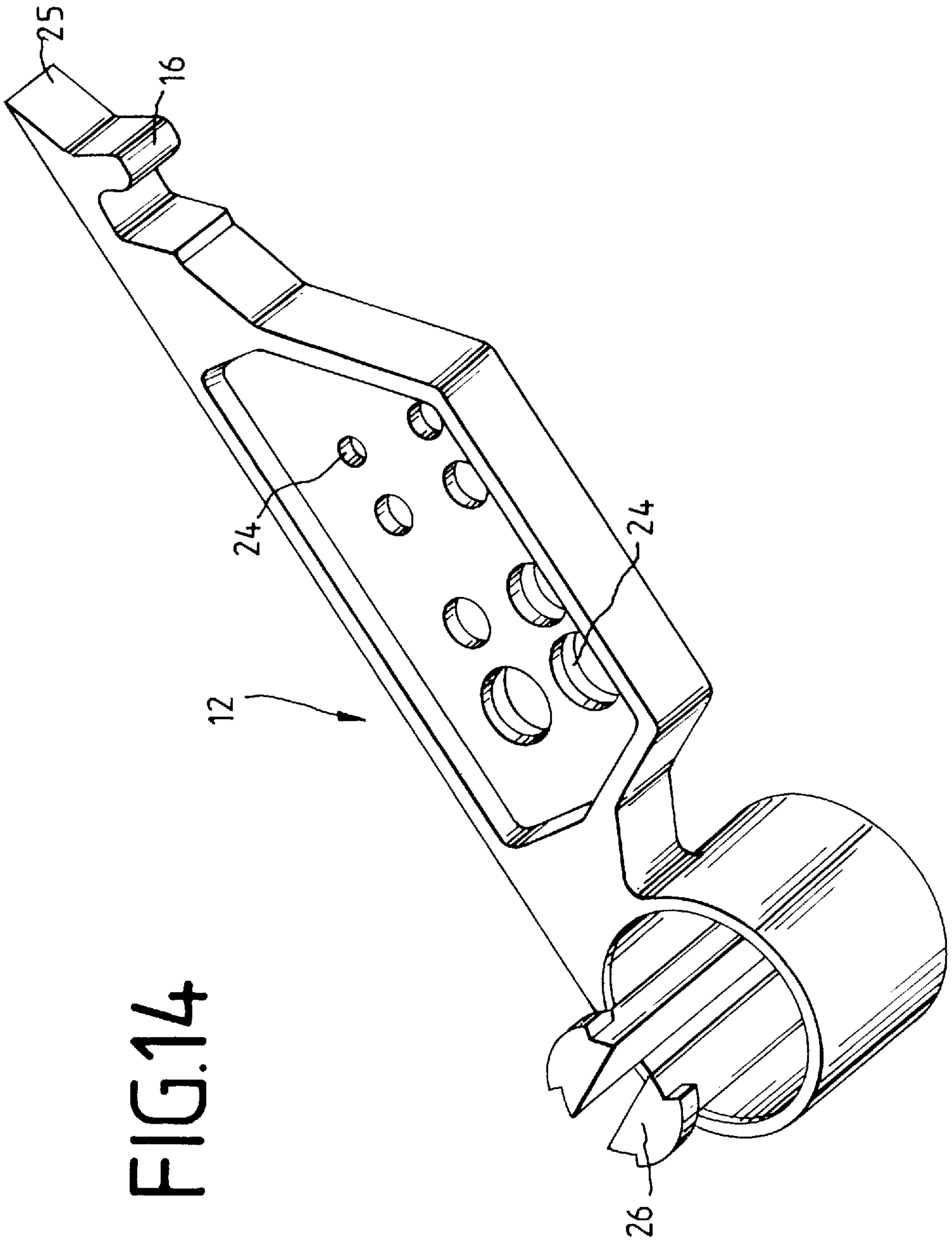
FIG. 14 is a perspective view of the wire diameter measuring and releasing device of FIG. 1.

When pressing down, the tool lies with the head part 27 of the pressure rod 6, FIG. 13, on the termination module, the knife shafts 28, FIG. 10, slide along the inclined, wedge-shaped guide and spread faces 29 of the cam housing 4 such that the knife blades 30, FIG. 10, will close in a scissors-type manner and cut the wire off laterally at the contact slot of the termination module. The spring 9 causes the blades 30 of the knives 5 to return after a termination process to the initial position. The shear movement of the knife blades 30 takes place about the point of rotation 21 formed by the pin 13.

When pressing the tool further down against the spring force of the spring 8, the pressure rod 6 with the head part 27 will be slid out in front of the knife blades 30 and pressed with the cut-off wire by means of the notch 31 in the head part 27, FIG. 13. The notch 31 is shaped complementary to, or as a negative image of, the contact slot. The notch 31 with the wire then presses the wire into the contact slot.

The retaining ring 10 limits the spring 8 in its extension and the spring loads the knife carrier 3 inside the cam housing 4.

The retaining ring 11 limits the spring 7 in its extension, and the spring 7 loading the pressure rod 6 inside the knife carrier 3.

The device 12, FIG. 1, 14, can be swung out of the housing handle 1 about an axis 26 and can downwardly be folded out. The device comprises measuring openings 24, through which the wire diameter and also the insulation diameter can be read. Further a hook 16 is provided in the folded-out tip 25 for removing the cables pressed into the termination element of the termination module.

While specific embodiments of the invention have been shown and described in detail to illustrate the application of the principles of the invention, it will be understood that the invention may be embodied otherwise without departing from such principles.

What is claimed is:

1. A termination tool for connecting a conductor to a contact element in a termination module, the tool comprising:

a housing handle defining an opening;

a pressure rod with springs extending into and out of said opening, said pressure rod forming a pressing means for pressing the conductor into the contact elements;

a cam housing extending into and out of said opening;

a knife carrier extending into and out of said opening;

a plurality of knives provided on said knife carrier and slidable against said cam housing to cut the conductor;

a cover covering said pressure rod, said cam housing, said plurality of knives and said housing handle, said cover being slidable on said housing handle during activation of said pressing means and said plurality of knives.

2. A termination tool in accordance with claim 1, wherein:

said cover with said pressure rod, said cam housing, and said plurality of knives are mountable on said housing handle in four latch positions.

3. A termination tool in accordance with claim 1, wherein:

a fold-out wire diameter measuring and releasing device is connected to said housing handle.

4. A termination tool in accordance with claim 1, wherein:

said cam housing includes wedge shaped guide and spread faces;

said plurality of knives are rotatably mounted on said knife carrier about a point of rotation of a pin, said knife carrier being slidable along an inner side of said cam housing, each of said plurality of knives including knife shafts guided by said wedge-shaped guide and spread faces of said cam housing to close said plurality of knives in a scissors-type manner.

5. A termination tool in accordance with claim 1, wherein:

said pressure rod and said knife carrier include return springs.

6. A termination tool for connecting a wire to a contact element, the tool comprising:

a housing handle defining an opening;

a pressure rod with springs slidable in said housing handle and extending out of said opening, said pressure rod having an end comprising a pressing means for pressing the wire into the contact elements;

a cam housing mounted on said handle housing;

a knife carrier slidable in said housing handle and extending out of said opening;

a plurality of knives provided on said knife carrier and slidable against said cam housing to cut the wire;

a cover covering said pressure rod, said cam housing, said plurality of knives and said housing handle, said cover being slidable on said housing handle during activation of said pressing means and said plurality of knives.

7. A termination tool in accordance with claim 6, wherein:

said cam housing including a cam surface;

said plurality of knives are rotatably mounted on said knife carrier, each of said plurality of knives including a knife shaft guided by said cam surface of said cam housing to rotate said plurality of knives and cut the wire.

8. A termination tool in accordance with claim 6, wherein:

said pressure rod and said knife holder include return springs for biasing said pressure rod and said knife carrier out of said opening.

* * * * *